March 29, 1960     W. H. HOGAN     2,930,547
LANDING GEAR STEERING MECHANISM
Filed June 17, 1955     3 Sheets-Sheet 1
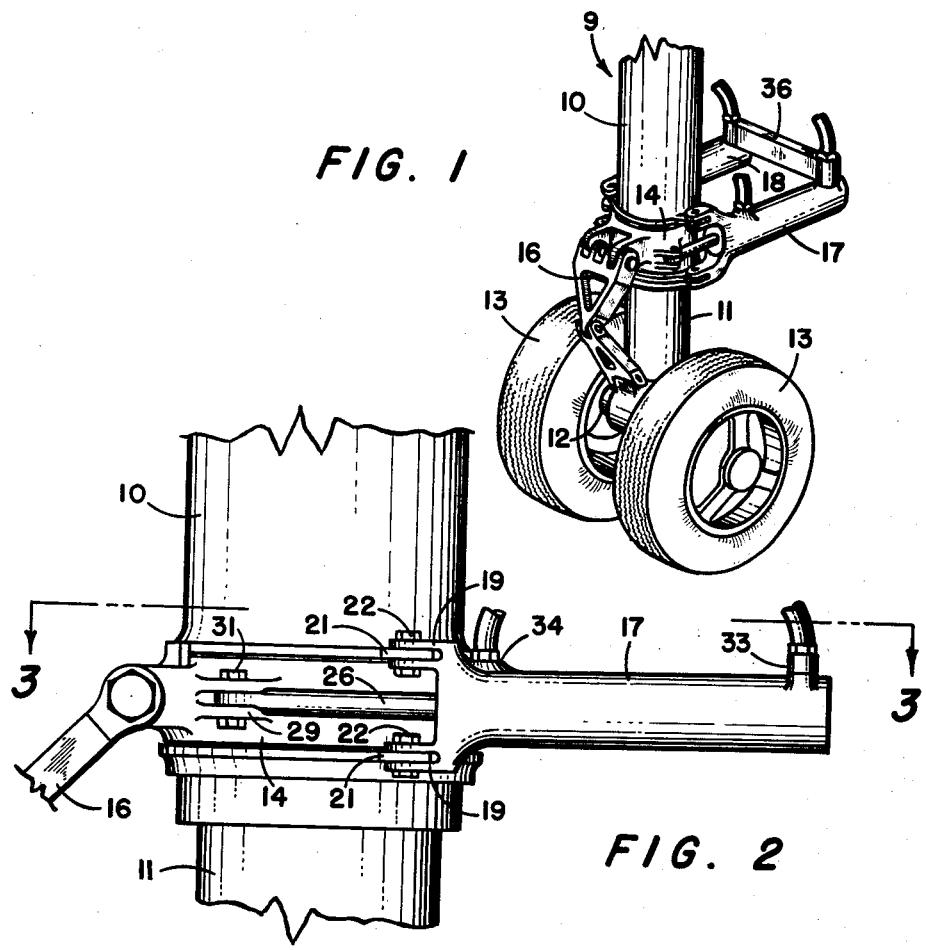
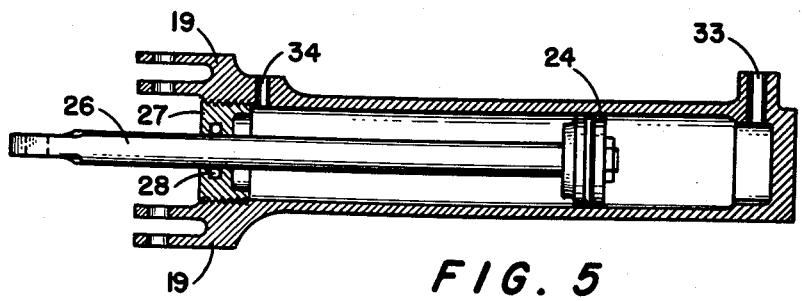
INVENTOR.
WALTER H. HOGAN
BY
ATTORNEY March 29, 1960

W. H. HOGAN 2,930,547

LANDING GEAR STEERING MECHANISM

Filed June 17, 1955

INVENTOR.
WALTER H. HOGAN
BY
ATTORNEY

INVENTOR.
WALTER H. HOGAN

United States Patent Office 2,930,547
Patented Mar. 29, 1960

2,930,547

LANDING GEAR STEERING MECHANISM

Walter H. Hogan, Olmsted Falls, Ohio, assignor to Cleveland Pneumatic Industries, Inc., Cleveland, Ohio, a corporation of Ohio Application June 17, 1955, Serial No. 516,185

7 Claims. (Cl. 244—50)

This invention relates generally to aircraft structures and more particularly to a new and improved steering mechanism for use in the ground steering of an aircraft.

It is an important object of this invention to provide a new and improved light weight stable steering mechanism particularly adapted for installation in the nose strut of an aircraft.

It is another important object of this invention to provide a simplified steering mechanism for aircraft which is efficient throughout the entire range of steering.

It is still another important object of this invention to provide a steering mechanism which is structurally simple so that manufacturing and maintenance costs will be low.

Further objects and advantages will appear from the following description and drawings, wherein:

Figure 1 is a perspective view of the preferred steering mechanism according to this invention shown as it would be used in connection with a nose strut of an aircraft landing gear;

Figure 2 is a fragmentary side elevation showing the mounting of the piston and cylinder;

Figure 5 is an enlarged longitudinal section of the piston and cylinder structure; and, Figure 6 is a plan view of a modified structure illustrating how the steering system may be changed to fit a different envelope.

Figure 3:
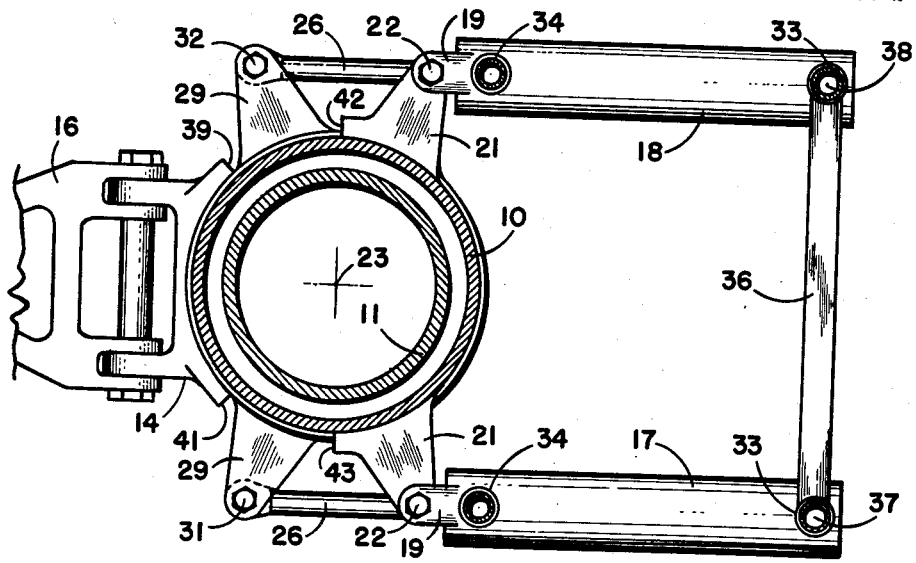
Figure 3 is a cross section taken along 3—3 of Figure 2 showing the position of the elements when the steering mechanism is in the neutral position at which time the wheels are aligned with the axis of the aircraft.

For a clear understanding of this invention, reference should be made to the drawings wherein Figure 1 shows a perspective view of the preferred steering mechanism installed on a conventional aircraft landing gear or strut 9. The strut includes an upper telescoping member 10 and a lower telescoping member 11 wherein the upper telescoping member is adapted to be fixed to the aircraft and the lower telescoping member is axially movable and rotatable relative to the upper telescoping member. A laterally extending axle 12 is provided at the lower end of the lower telescoping member 11 on which ground engaging wheels 13 are journaled. A fluid spring mechanism and shock absorber is incorporated inside the telescoping members 10 and 11, but since it is of conventional design and forms no part of this invention, it has not been shown. A steering collar 14 is journaled on the upper telescoping member 10 for rotation around the central axis 23 of the strut while being axially fixed relative thereto. The usual torque arms 16 are connected at their upper end to the steering collar 14 and at their lower end to the lower telescoping member 11 to prevent relative rotation between the steering collar 14 and the lower telescoping member 11 while permitting relative axial motion therebetween.

A pair of similar cylinders 17 and 18 are formed with axially extending mounting arms 19 which are pivoted on mounting lugs 21 formed on the upper telescoping member 10 by pivot pins 22, so that the cylinders may rotate around a pivot axis which is parallel to and spaced from the central axis 23. Generally these two cylinders are located within a single horizontal plane and extend rearwardly of the strut 9 relative to the normal forward motion of the airplane. A piston 24 and a piston rod 26 are mounted in each of the cylinders 17 and 18 with the piston rod 26 extending beyond the end of the cylinders on which the mounting arms 19 are formed. A gland nut 27 provided with a seal 28 assures lateral support and prevents leakage of fluid along the piston rod 26. The free end of the piston rod 26 of the cylinder 17 is pivoted on mounting lugs 29 formed on the steering collar 14 by a pivot pin 31 and the free end of piston rod 26 of the cylinder 18 is pivoted on mounting lugs 29 formed on the steering collar 14 by a pivot pin 32. The axis of the pivot pins 31 and 32 are parallel to the axis 23 of the strut and spaced therefrom a distance equal to the spacing between the central axis 23 and the axis of the pivot pins 22.

Each of the cylinders 17 and 18 is provided with a rearward fluid port 33 and a forward fluid port 34 which are connected through a control valve to a fluid pressure system utilized for steering. The control valve should be arranged so that when steering to the right (see Figure 4) fluid under pressure is introduced into the cylinder 17 through the rearward port 33 and into the cylinder 18 through the forward port 34. At the same time the forward port 34 of the cylinder 17 and the rearward port 33 of the cylinder 18 should be connected to the reservoir return. This will cause a forward force on the piston rod 26 of the cylinder 17 and a rearward force on the piston rod 26 of the cylinder 18 which will rotate the steering collar 14 to the right and in turn rotate the lower telescoping member 11 through the torque arms 16. When it is desired to turn the wheels in the opposite direction, it is merely necessary to reverse the flow of the fluid through the connections. A preferred control valve that will satisfy these requirements is described in detail in my copending application, Serial No. 489,987 filed February 23, 1955.

The proportions of the mounting lugs 21 and 29 and their relative positions are arranged so that the axis of the cylinders 17 and 18 are parallel at all times and also so that at least one of the pivot pins 31 or 32 is always spaced from the corresponding pivot pin 22. Because the pivots 22 and 31 of the cylinder 17 are equally spaced from the central axis 23 of the strut and the axis of the pivots 22 and 32 of the cylinder 18 are equally spaced from the central axis 23, rotational movement of the steering collar 14 through a given angle will cause each of the cylinders 17 and 18 to rotate around their respective pivots 22 through an angle equal to one-half of the given angle. The proportions of the mounting lugs, the pistons and the cylinders are arranged so that the cylinders 17 and 18 are parallel when the steering collar is in the neutral position. Since both of the cylinders 17 and 18 rotate through an angle equal to one-half the angle of turning of the steering collar 14 when it is rotated, they remain parallel as the steering system operates.

When the pivots 31 and 32 are spaced from their respective pivots 22, the cylinders and piston rods are restrained against uncontrolled rotation around the pivots 22. However, when either of the pivots 31 or 32 is axially aligned with its corresponding pivot 22, the corresponding cylinder would be free to rotate in an uncontrolled manner around its pivot 22. A tie bar 36 is pivoted on the cylinders 17 and 18 for rotation around the axis 37 of the rearward port 33 on the cylinder 17 and rotation around the axis 38 of the rearward port 33 on the cylinder 18. The distance between the axes 37 and 38 is equal to the distance between the pivots 22 and both of the axes 37 and 38 are equally spaced from the corresponding pivot pins 22 so that a paralleling mechanism is provided which rigidly maintains the cylinders parallel. Also the various elements are arranged so that when the pivot 32 is axially aligned with its corresponding pivot 22, the pivot 31 is spaced from its corresponding pivot 22. Such structure insures that one or the other of the cylinders 17 and 18 will always be stable. Since the tie bar 36 maintains the two cylinders parallel at all times and since one of the cylinders is always stable, a stable system results in all positions of steering. This is clearly illustrated in Figure 4 wherein the cylinder 18 would be free to rotate about its pivot 22 since the pivot 32 is coaxial therewith if it were not for the fact that the tie bar 36 maintains it parallel to the cylinder 17 which is stable in this position. Conversely, when the pivots of the cylinder 17 are coaxial the pivots on the cylinder 18 are spaced so the cylinder 18 will stabilize the cylinder 17 through the connection of the tie bar.

Figure 4:
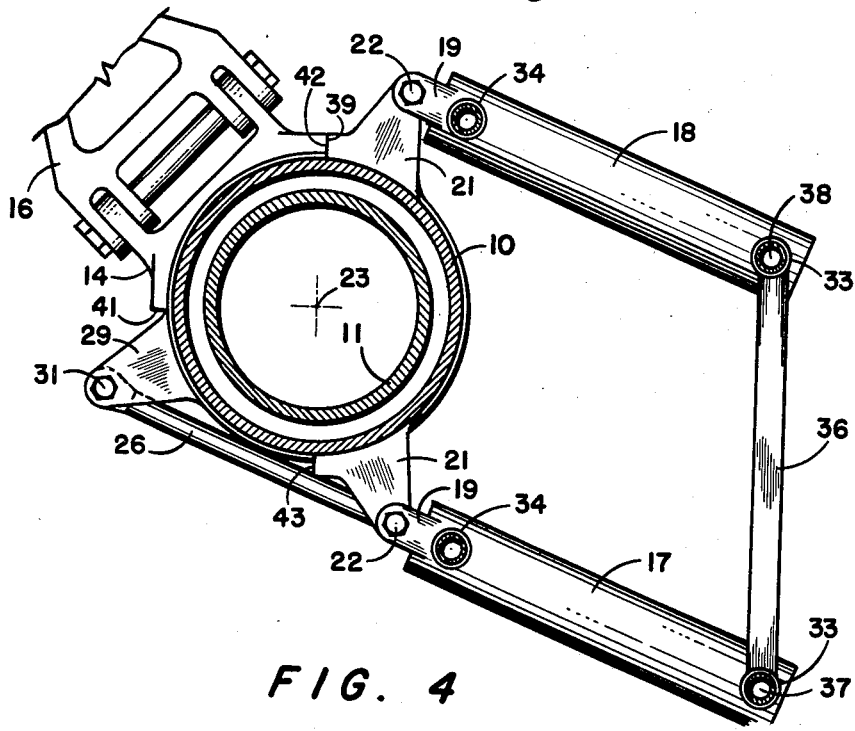
Figure 4 is a cross section similar to Figure 3 showing the position the elements assume when the steering is turned to one extreme of the steering range.

The efficiency of steering in a steering mechanism according to this invention is high since, when the efficiency of one of the cylinders decreases due to the fact that the two pivots are substantially spaced as is the case of the piston rod 26 of the cylinder 17 shown in Figure 4, the cylinder 18 moves to a more efficient position. Since the axis of cylinder 18 (shown in Figure 4) is substantially perpendicular to a radial line extending from the axis 23 to the pivot 22, the moment arm is large and the torque transmitting efficiency is high. At the same time the effective moment arm of the piston rod 26 of the cylinder 17 is relatively low; however, since the efficiency of one of the cylinders increases as the efficiency of the other cylinder decreases, the net efficiency remains relatively constant throughout the entire range of steering.

The steering collar 14 is formed with two stop surfaces 39 and 41 which are engageable with stop surfaces 42 and 43 respectively formed on the upper telescoping member 10 when the steering collar 14 has turned to one or the other extreme of turning. The use of the stop to limit the rotation of the steering collar 14 projects the cylinders and pistons since it prevents bottoming of the pistons 24 against the ends of the cylinders.

Figure 6:
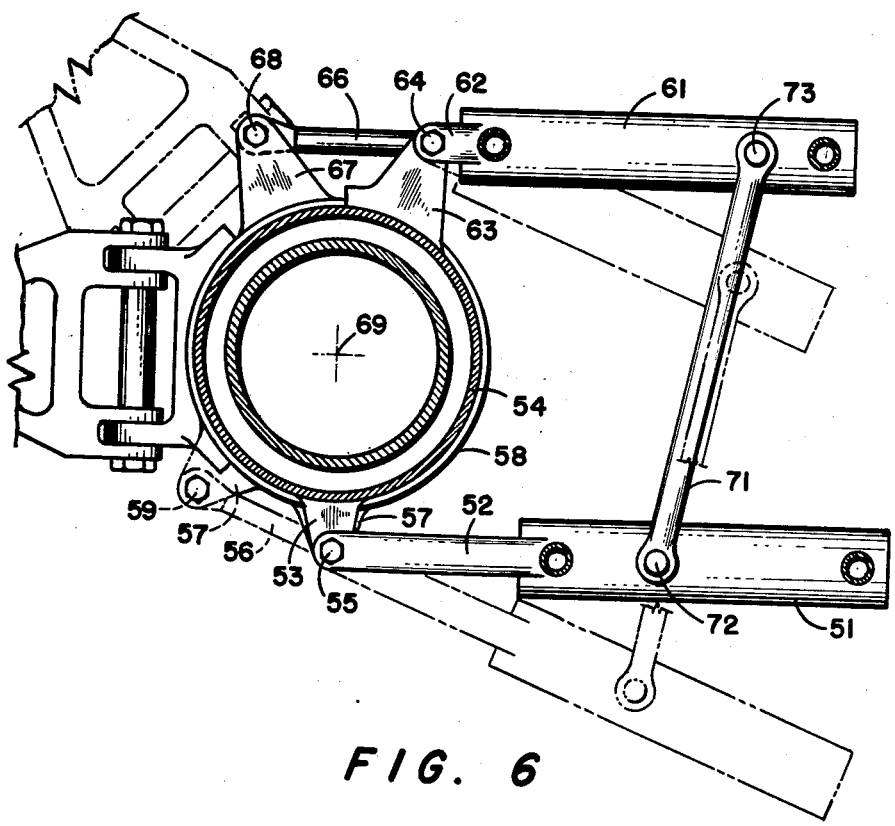

Figure 6 discloses a modified structure which would be utilized in some installation. In this case the two cylinders are not similar but rather one cylinder 51 is provided with longer mounting arms 52 which are pivoted to a mounting lug 53 on an upper telescoping member 54 by means of a pivot pin 55. A piston rod 56 for the cylinder 51 is pivoted on a mounting lug 57 formed on a steering collar 58 by means of a pivot pin 59. The proportions of the various elements are arranged so that the pivot pins 55 and 59 are coaxial when the steering mechanism is in the neutral position which is in the position shown in Figure 6. A second steering cylinder 61 is provided with mounting arms 62 which are pivoted to a mounting lug 63 formed on the upper telescoping member 54 by a pivot pin 64. A piston rod 66 for the cylinder 61 is pivoted on a mounting lug 67 formed on the steering collar 58 by means of a pivot pin 68. In this case the proportions of the elements are arranged so that the pivot pins 64 and 68 are spaced from each other when the steering mechanism is in the neutral position. The distance between the pivot pins 55 and 59 of the cylinder 51 and the piston rod 56 respectively and a central axis 69 are equal as is the case in the previous embodiment. Also the distance between the pivot pins 64 and 68 of the cylinder 61 and piston rod 66 respectively from the central axis 69 are equal. However, the distance between the pivots of one cylinder and piston and the central axis 69 need not be equal to the distance between the central axis 69 and the pivots of the other cylinder and piston. This is clearly illustrated in Figure 6. Because the pivots of the corresponding cylinder and piston are equally spaced from the central axis 69, the cylinders will rotate about their respective pivots through an angle equal to one-half the turning angle of the steering collar 58. Therefore, they will remain parallel through all angles of steering in the same manner as the embodiment shown in Figures 1 through 4. A stabilizing bar 71 is pivoted on the cylinder 51 for rotation around an axis 72 and on the cylinder 61 for rotation around an axis 73. Here again the distance between the axis 72 and the axis of the pivot pin 55 is equal to the spacing between the axis 73 and the axis of the pivot pin 64. Also the spacing between the axes 72 and 73 is equal to the spacing between the axes of the pivot pins 55 and 64 so a parallelogram results. When the axis of the pivot pins 55 and 59 are coaxial which is the case when the steering is in the neutral position, the axis of the pivot pins 64 and 68 are spaced. Therefore, the cylinder 61 is stable and the cylinder 51 is restrained against uncontrolled rotation by the tie bar 71. Again, when the steering is in an extreme position such as the position shown in phantom at which time the axis of the pivot pins 64 and 68 are aligned, the axis of the pivot pins 55 and 59 are spaced so that the cylinder 51 is stable and restrains the cylinder 61 against uncontrolled rotation through the tie bar 71. It is, therefore, apparent that one of the cylinders is always stable so a stable system results in all positions of turning.

Those skilled in the art will recognize that by utilizing one or the other of the structures shown, or modifications which are within the scope of this invention, it is possible to produce a light weight efficient steering mechanism which satisfies all of the needs of aircraft steering. Also because such structure embodies simplicity of design, the manufacturing and maintenance costs are low.

Although preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. In a steering mechanism of the character described, a support element, a rotatable element mounted on said support element for rotation about a first axis, first and second cylinder members and cooperating fluid actuating piston members capable of relative axial movement, a mounting portion on each of said members extending beyond the one end of the associated cylinders generally in the same direction, each of said cylinder mounting portions being pivotally connected to one of said elements and each of said piston mounting portions being pivotally connected to the other of said elements, at least one cylinder pivot and its associated piston pivot being equally spaced from said first axis, at least one axis of the piston pivots being spaced from the axis of the associated cylinder pivot in all positions of steering to maintain stable said associated cylinder and its piston, and stabilizing means between said cylinder members.

2. In a steering mechanism of the character described, a support element, a rotatable element mounted on said support element for rotation about a first axis, first and second cylinder members and cooperating fluid actuating piston members capable of relative axial movement, a mounting portion on each of said members extending beyond the one end of the associated cylinders generally in the same direction, each of said cylinder mounting portions being pivotally connected to one of said elements and each of said piston mounting portions being pivotally connected to the other of said elements, each cylinder pivot being spaced from said first axis a distance equal to the spacing between its associated piston pivot and said first axis, at least one axis of the piston pivots being spaced from the axis of the corresponding cylinder pivot in all positions of steering to maintain stable said corresponding cylinder and its piston, and stabilizing means between said cylinder members.

3. In a steering mechanism of the character described, a support element, a rotatable element mounted on said support element for rotation about a first axis, a pair of cylinder members and cooperating fluid actuated piston members slidable relative thereto, a mounting portion on each of said members extending beyond the one end of the associated cylinders generally in the same direction, each of said cylinder mounting portions being pivotally connected to one of said elements and each of said piston mounting portions being pivotally connected to the other of said elements, all of said pivots being equally spaced from said first axis, at least one axis of the piston pivots being spaced from the axis of the corresponding cylinder pivot in all positions of steering, and stabilizing means extending between said corresponding members maintaining them parallel.

4. In a steering mechanism of the character described, a support element, a rotatable element mounted on said support element for rotation about a first axis, a pair of cylinder members and cooperating fluid actuated piston members capable of relative axial movement, a mounting portion on each of said members extending beyond the one end of the associated cylinders generally in the same direction each of said cylinder mounting portions being pivotally connected to one of said elements and each of said piston mounting portions being pivotally connected to the other of said elements, each cylinder pivot being spaced from said first axis a distance equal to the spacing between its associated piston pivot and said first axis, the axis of at least one of the piston pivots being spaced from the axis of the corresponding cylinder pivot in all positions of steering, and a stabilizing bar pivotally connected between said cylinders at points equally spaced from the pivot of the corresponding cylinder pivot.

5. In a steering mechanism of the character described, a support element, a rotatable element mounted on said support element for rotation about a first axis, a pair of cylinder members and cooperating fluid actuated piston members capable of relative axial movement, a mounting portion on each of said members extending beyond the one end of the associated cylinders generally in the same direction, each of said cylinder mounting portions being pivotally connected to one of said elements and each of said piston mounting portions being pivotally connected to the other of said elements, at least one cylinder member and its associated piston member being proportioned to permit the pivots thereof to move to a coaxial relationship in one position of steering, at least one axis of the piston pivots being spaced from the axis of the associated cylinder pivot in all positions of steering, and stabilizing means extending between said corresponding members maintaining them parallel.

6. In a steering mechanism of the character described, a support element, a rotatable element mounted on said support element for rotation about a first axis in either direction from a first position of angular alignment, first and second cylinder members and cooperating fluid actuating piston members capable of relative axial movement, a mounting portion on each of said members extending beyond the one end of the associated cylinders generally in the same direction, each of said cylinder mounting portions being pivotally connected to said support element and each of said piston mounting portions being pivotally connected to said rotatable element, the axis of each cylinder pivot being spaced from said first axis a distance equal to the spacing between said first axis and the axis of the associated piston pivot, at least one axis of the piston pivots being spaced from the axis of the associated cylinder pivot in all positions of steering, and stabilizing bar pivotally connected between said cylinder member maintaining them parallel.

7. In a steering mechanism of the character described, a support element, a rotatable element mounted on said support element for rotation relative thereto, a pair of motor assemblies each including a cylinder member and a cooperating fluid actuated piston member slidable relative thereto, a mounting portion on each of said members, each of said cylinder mounting portions being pivotally connected to one of said elements and each of said piston mounting portions being pivotally connected to the other of said elements, said motor assemblies being proportioned to cause the pivots of at least one of said assemblies to be non-coaxial to prevent rotation of the members thereof about their pivots when the pivots of the other of said assemblies are coaxial, and means extending from said one assembly to said other assembly to prevent uncontrolled rotation of the latter about its pivots.

References Cited in the file of this patent

UNITED STATES PATENTS

| | | |
|---|---|---|
| 2,650,782 | Fehring | Sept. 1, 1953 |
| 2,779,556 | Hogan | Jan. 29, 1957 |